(12) United States Patent
Kasuga et al.

(10) Patent No.: US 7,087,543 B2
(45) Date of Patent: Aug. 8, 2006

(54) OPTICAL GLASS, PRESS-MOLDING PREFORM AND OPTICAL ELEMENT

(75) Inventors: Yoshiko Kasuga, Tokyo (JP); Xuelu Zou, Tokyo (JP)

(73) Assignee: Hoya Corporation, Tokyo (JP)

( * ) Notice: Subject to any disclaimer, the term of this patent is extended or adjusted under 35 U.S.C. 154(b) by 95 days.

(21) Appl. No.: 10/608,435

(22) Filed: Jun. 30, 2003

(65) Prior Publication Data

US 2004/0127343 A1    Jul. 1, 2004

(30) Foreign Application Priority Data

Jul. 3, 2002    (JP) .............................. 2002-194178

(51) Int. Cl.
C03C 3/066    (2006.01)
C03C 3/095    (2006.01)
C03C 4/00    (2006.01)
C03C 3/093    (2006.01)

(52) U.S. Cl. ............................ 501/79; 501/64; 501/65; 501/66; 501/67; 501/903

(58) Field of Classification Search ............ 501/64–67, 501/77–79, 903
See application file for complete search history.

(56) References Cited

U.S. PATENT DOCUMENTS

| 4,343,908 | A | * | 8/1982 | Faulstich et al. | 501/78 |
|---|---|---|---|---|---|
| 4,486,541 | A | * | 12/1984 | Gliemeroth et al. | 501/13 |
| 5,340,778 | A | * | 8/1994 | Kloss et al. | 501/52 |
| 5,472,918 | A | * | 12/1995 | Onozawa | 501/65 |
| 5,744,409 | A | * | 4/1998 | Hashimoto et al. | 501/65 |
| 5,919,718 | A | * | 7/1999 | Hirota et al. | 501/64 |
| 5,932,501 | A | * | 8/1999 | Brocheton | 501/64 |
| 6,380,112 | B1 | * | 4/2002 | Kolberg et al. | 501/77 |
| 6,713,419 | B1 | * | 3/2004 | Onozawa et al. | 501/78 |
| 6,816,235 | B1 | * | 11/2004 | Kido et al. | 355/67 |

FOREIGN PATENT DOCUMENTS

| JP | 03005341 | A | * | 1/1991 |
|---|---|---|---|---|
| JP | 3150992 | B | | 10/1992 |
| JP | 2872899 | B | | 6/1995 |
| JP | 11079781 | A | * | 3/1999 |
| JP | 2000302479 | A | * | 10/2000 |
| JP | 2002187735 | A | * | 7/2002 |
| JP | 2003176151 | A | * | 6/2003 |
| JP | 2004002178 | A | * | 1/2004 |
| WO | WO 200021895 | A1 | * | 4/2000 |
| WO | WO 200160753 | A1 | * | 8/2001 |

OTHER PUBLICATIONS

Derwent-Acc-No. 2003-725226, Derwent Abstract of JP 2003-176151 A.*
Derwent-Acc-No. 2004-094166, Derwent Abstract of JP 2004-2178 A.*
Derwent-Acc-No. 2001-141379, Derwent Abstract of JP 2000-302479 A.*
Derwent-Acc-No. 1991-054676, Derwent Abstract of JP 3-5341 A.*

* cited by examiner

Primary Examiner—J. A. Lorengo
Assistant Examiner—Elizabeth A. Bolden
(74) Attorney, Agent, or Firm—Nixon & Vanderhye P.C.

(57) ABSTRACT

An optical glass having a refractive index (nd) of 1.57 to 1.67, an Abbe's number (vd) of 55 to 65 and a glass transition temperature (Tg) of 560° C. or lower and having a low-temperature softening property and excellent climate resistance or a haze value of 3% or less, or an optical glass comprising, by mol %, 22 to 40% of $B_2O_3$, 12 to 40% of $SiO_2$, 2 to 20% of $Li_2O$, 5 to 15% of CaO, 2 to 14% of ZnO, 0.5 to 4% of $La_2O_3$, 0 to 3% of $Gd_2O_3$, 0 to 3% of $Y_2O_3$, the total content of $La_2O_3$, $Gd_2O_3$ and $Y_2O_3$ being at least 1%, 0 to 5% of $Al_2O_3$, 0 to 3% of $ZrO_2$ and 0 to 5% of BaO, the total content of the above components being more than 96%, and having a refractive index (nd) of 1.57 to 1.67 and an Abbe's number (vd) of 55 to 65.

12 Claims, 1 Drawing Sheet

OPTICAL GLASS, PRESS-MOLDING PREFORM AND OPTICAL ELEMENT

BACKGROUND OF THE INVENTION

1. Field of the Invention

The present invention relates to an optical glass, a press-molding preform, a process for producing the preform, an optical element and a process for producing the optical element. More specifically, the present invention relates to an optical glass having specific optical constants and having excellent climate resistance, particularly, an optical glass having a low-temperature softening property suitable for press-molding, a press-molding preform made of the above optical glass, a process for producing the preform, an optical element and a process for producing the optical element.

2. Prior Art

Optical glasses having optical constants such as a refractive index (nd) of 1.57 to 1.67 and an Abbe's number (vd) of 55 to 65 are useful as a material for optical elements such as a lens, and "Glass Data Book" issued by Japan Glass Product Society describes such glasses as SK type glass. However, these glasses are not suitable as a glass for precision press-molding, since they generally have a high glass transition temperature of over 560° C. When a glass for press-molding has a high molding temperature, there is caused a problem that the surface of a press mold may be damaged or that the material constituting the mold is degraded in durability, so that it is desirable that the glass transition temperature of the glass should be as low as possible. For overcoming the above problems, there is known a glass containing a larger amount of an alkali such as $Li_2O$ such as an $SiO_2$—$B_2O_3$—SrO—$Li_2O$ glass (JP-B-2872899) or a glass containing an alkali and $TeO_2$ such as an $SiO_2$—$B_2O_3$—BaO glass (JP-B-3150992).

Meanwhile, the present inventors have noted that glasses having a refractive index (nd) of approximately 1.57 to 1.67 and an Abbe's number (vd) of approximately 55 to 65 generally have insufficient climate resistance. The climate resistance of a material glass is a very important property for using an optical element such as a lens in a good condition for a long period of time.

However, the glass disclosed in the above JP-B-2872899 contains large amounts of SrO and $Li_2O$, so that it has defects that it is poor in climate resistance and that a press-molded product is liable to be cloudy when it is press-molded. Further, the glass disclosed in JP-B-3150992 seeks to decrease its glass transition temperature by introducing an alkali and $TeO_2$. However, the glass is degraded in chemical durability to a great extent, so that it is unsuitable as a glass for press-molding (precision press-molding).

Under the circumstances, the present inventors have found it greatly useful for industrial developments in the field of this art to provide an optical glass having the above optical constants and a low-temperature softening property to permit press-molding and having excellent climate resistance.

SUMMARY OF THE INVENTION

Under the circumstances, it is an object of the present invention to provide an optical glass having a refractive index (nd) of 1.57 to 1.67 and an Abbe's number (vd) of 55 to 65 and having a low-temperature softening property and excellent climate resistance, a preform made of the above optical glass for press-molding, and an optical element.

The present inventors have made diligent studies and as a result have found the following. When an optical glass having a refractive index (nd) of 1.57 to 1.67 and an Abbe's number (vd) of 55 to 65 is imparted with a low-temperature softening property, it is also required to impart the glass with a haze value of 3% or less in terms of climate resistance in view of production, use and storage of an optical element. Further, it has been found that the glass transition temperature (Tg) can be decreased to a great extent by introducing a large amount of ZnO in place of BaO and SrO and that the glass can be improved in durability. It has been further found that the glass can be remarkably improved in climate resistance by incorporating a large amount of $La_2O_3$. The present invention has been accordingly completed.

That is, according to the present invention, there are provided;

(1) an optical glass having a refractive index (nd) of 1.57 to 1.67, an Abbe's number (vd) of 55 to 65 and a glass transition temperature (Tg) of 560° C. or lower and having a haze value of 3% or less in terms of climate resistance (to be referred to as "optical glass I" hereinafter), (2) an optical glass having a refractive index (nd) of 1.57 to 1.67, an Abbe's number (vd) of 55 to 65 and having a haze value of 3% or less in terms of climate resistance, the optical glass being for use in precision press-molding (to be referred to as "optical glass II" hereinafter), (3) an optical glass comprising $B_2O_3$, $SiO_2$, $Li_2O$, CaO, ZnO and $La_2O_3$, having a refractive index (nd) of 1.57 to 1.67, an Abbe's number (vd) of 55 to 65 and a glass transition temperature (Tg) of 560° C. or lower and having a haze value of 3% or less in terms of climate resistance (to be referred to as "optical glass III" hereinafter), (4) an optical glass comprising, by mol %, 22 to 40% of $B_2O_3$, 12 to 40% of $SiO_2$, 2 to 20% of $Li_2O$, 5 to 15% of CaO, 2 to 14% of ZnO, 0.5 to 4% of $La_2O_3$, 0 to 3% of $Gd_2O_3$, 0 to 3% of $Y_2O_3$, the total content of $La_2O_3$, $Gd_2O_3$ and $Y_2O_3$ being at least 1%, 0 to 5% of $Al_2O_3$, 0 to 3% of $ZrO_2$ and 0 to 5% of BaO, the total content of the above components being more than 96%, and having a refractive index (nd) of 1.57 to 1.67 and an Abbe's number (vd) of 55 to 65 (to be referred to as "optical glass IV" hereinafter), (5) a press-molding preform, which is made of the optical glass recited in any one of the above (1) to (4), (6) an optical element made of the optical glass recited in any one of the above (1) to (4), (7) a process for producing a preform for press-molding, which comprises separating a predetermined amount of a molten glass gob from a molten glass flow of the optical glass recited in any one of the above (1) to (4), and forming the gob into a glass preform, (8) a process for producing an optical element, which comprises heating, softening and press-molding the preform recited in the above (5).

(9) a process for producing an optical element, which comprises heating, softening and press-molding a preform obtained by the process recited in the above (7).

PREFERRED EMBODIMENTS OF THE INVENTION

Figure 1:
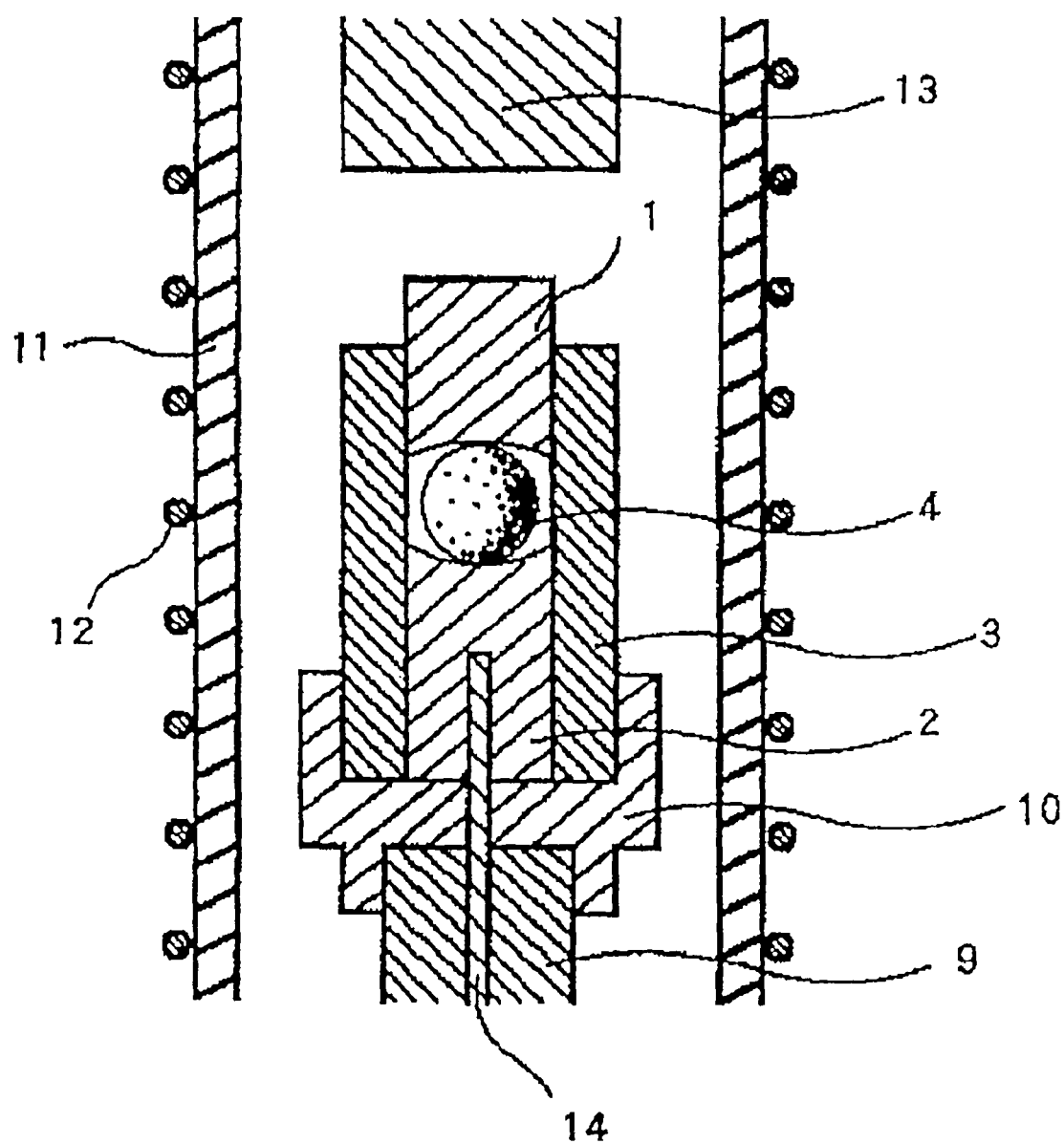
FIG. 1 is schematic cross-sectional view of a precision press-molding apparatus for use in Example 1.

The optical glass of the present invention includes four embodiments that are optical glasses I to IV. The optical glass I will be explained first.

The optical glass 1 of the present invention is a glass having a refractive index (nd) of 1.57 to 1.67 and an Abbe's number (vd) of 55 to 65 and a glass transition temperature (Tg) of 560° C. or lower and having a haze value of 3% or less in terms of climate resistance.

When the above glass transition temperature (Tg) exceeds 560° C., the adaptability of the precision press-molding sharply decreases, and it is difficult to produce a good optical element by precision press-molding. The glass transition temperature (Tg) is preferably 550° C. or lower, more preferably 540° C. or lower.

Further, when the haze value exceeds 3%, it is difficult to use or store the glass for a long period of time or to allow the glass to exhibit its full performance under normal environments in which lenses are used or under further severe environments. For obtaining an optical element having an excellent surface when the optical glass I is precision press-molded, the haze value of the optical glass 1 is also limited to 3% or less. The haze value is preferably 2% or less, more preferably 1% or less.

The optical glass II of the present invention is a glass for precision press-molding, which has a refractive index (nd) of 1.57 to 1.67 and an Abbe's number (vd) of 55 to 65 and has a haze value of 3% or less in terms of climate resistance.

In the optical glass II, the climate resistance is defined as described above for the same reason as that explained with regard to the optical glass I. The haze value is preferably 2% or less, more preferably 1% or less.

In the present invention, the precision press-molding refers to a method in which a formed glass preform made of an optical glass is heated to soften it and pressed with a mold, to precisely transfer the form of molding surface of the mold to the optical glass and to form the preform to a press-molded article having a predetermined form, and in which an accurate glass product can be produced without machining the surface to which the above molding surface has been transferred. For example, when an optical element is produced by precision press-molding, a surface that transmits, reflects, refracts or diffracts light, i.e., an optical-function surface can be formed by transfer the molding surface of a mold without machining the surface. The precision press-molding is also called mold optics forming, and it enables the formation of the optical-function surface that is required to have accuracy, such as an aspherical surface, a spherical surface, fine grooves of a diffraction grating, and the like without applying machining.

In the optical glass II, the glass transition temperature (Tg) thereof is preferably 560° C. or lower, more preferably 550° C. or lower, still more preferably 540° C. or lower.

The optical glass III is a glass comprising $B_2O_3$, $SiO_2$, $Li_2O$, CaO, ZnO and $La_2O_3$, having a refractive index (nd) of 1.57 to 1.67, an Abbe's number (vd) of 55 to 65 and a glass transition temperature (Tg) of 560° C. or lower and having a haze value of 3% or less in terms of climate resistance.

In the optical glass III, the glass transition temperature (Tg) thereof is limited to 560° C. or lower for the same reason as that described with regard to the optical glass I. The glass transition temperature (Tg) is preferably 550° C. or lower, more preferably 540° C. or lower. Further, the haze value thereof is limited to 3% or less for the same reasons as those described with regard to the optical glasses I and II. The haze value is preferably 2% or less, more preferably 1% or less.

The above haze value refers to data obtained by quantifying the degree of cloudiness that occurs on the optically polished surface of an optical glass, and it is a percentage value obtained by measuring a sample set in one of two predetermined positions of a haze meter for a transmittance, measuring the sample set in the other predetermined position for a transmittance, and dividing a difference between the obtained two transmittance values by one of the obtained transmittance values above. Specifically, a sample having the form of a 20×20×2 mm plate is provided, and both the surfaces thereof are optically polished. It can be easily found whether or not the optical polishing is sufficiently performed, since no scratching is found on the polished surface when the optical polishing is sufficiently performed. A polished sample is washed and then held in an environmental tester (Clean constant-temperature constant-humidity tester "PCR-3SP" supplied by ESPEC Corp.) set at a temperature of 65° C. and at a relative humidity of 0% in a clean booth (class 1000) for 1 hour, and then the sample is held therein at 65° C. at a relative humidity 95% (using ultrapure water) for 2 weeks. The thus-prepared glass ample is measured for haze values with a haze meter ("AUTOMATIC HAZE METER MODEL TC-H III DPK" supplied by Tokyo Denshoku K.K.).

When no glass sample having the above size is available, a glass having the same composition is melted, and a sample machined to have the above size can be measured for haze values.

In the optical glass III, $B_2O_3$ is a component for forming a glass network structure, and it is also a component for imparting the glass with a low-dispersion property and decreasing the softening temperature of the glass. $SiO_2$ is a component for forming a glass network structure like $B_2O_3$, and it is also a component for improving the glass in durability. $Li_2O$ is a component that is incorporated for improving the glass in low-temperature softening property. CaO is a component for imparting the glass with a low-temperature softening property and desired optical constants when it is co-present with $B_2O_3$ and $SiO_2$. ZnO is an essential component for maintaining the low-temperature softening property and high climate resistance of the glass. $La_2O_3$ is incorporated both for improving the glass in durability and climate resistance and for adjusting the optical constants of the glass. The optical glass III of the present invention may comprise 0.5 to 4 mol % of $La_2O_3$. In addition to the above components, $Gd_2O_3$, $Y_2O_3$, $Al_2O_3$, $ZrO_2$ and BaO may be incorporated. The optical glass III preferably includes a glass comprising $B_2O_3$, $SiO_2$, $Li_2O$, CaO, ZnO, $La_2O_3$, $Gd_2O_3$, $Y_2O_3$, $Al_2O_3$ and $ZrO_2$, a glass comprising $B_2O_3$, $SiO_2$, $Li_2O$, CaO, ZnO, $La_2O_3$, $Gd_2O_3$, $Y_2O_3$, $Al_2O_3$, $ZrO_2$ and BaO, and glasses obtained by adding a refining agent to each of the above two glasses.

The optical glass IV of the present invention is a glass comprising, by mol %, 22 to 40% of $B_2O_3$, 12 to 40% of $SiO_2$, 2 to 20% of $Li_2O$, 5 to 15% of CaO, 2 to 14% of ZnO, 0.5 to 4% of $La_2O_3$, 0 to 3% of $Gd_2O_3$, 0 to 3% of $Y_2O_3$, the total content of $La_2O_3$, $Gd_2O_3$ and $Y_2O_3$ being at least 1%, 0 to 5% of $Al_2O_3$, 0 to 3% of $ZrO_2$ and 0 to 5% of BaO, the total content of the above components being more than 96%, and having a refractive index (nd) of 1.57 to 1.67 and an Abbe's number (vd) of 55 to 65.

In the optical glass IV, the content of the components are limited to the above ranges for the following reasons. The following contents shown by % stand for contents by mol %.

$B_2O_3$ is a component for forming a glass network structure and is an essential component for imparting the glass with a low-dispersion property and decreasing the softening temperature of the glass. When the content thereof is less than 22%, the glass transition temperature (Tg) increases, and it is undesirable for imparting the glass with desired optical constants. When the above content exceeds 40%, the glass may be degraded in durability and oxidation resistance. The content of $B_2O_3$ is therefore limited to the range of 22 to 40%, and it is preferably in the range of 24 to 38%.

$SiO_2$ is a main component for forming a glass network structure like $B_2O_3$, and it is also a component for improving the glass in durability. When the content thereof is less than 12%, the durability of the glass tends to be sharply degraded. When it exceeds 40%, it is undesirable for imparting the glass with a low-temperature softening property and desired optical constants. The content of $SiO_2$ is therefore limited to the range of 12 to 40%. It is preferably in the range of 15 to 35%.

$Li_2O$ is a component that is incorporated for improving the glass in low-temperature softening property. When the content thereof is less than 2%, the glass has a high softening temperature, and it is difficult to press a preform made of the glass. When the content thereof exceeds 20%, the liquidus temperature of the glass sharply increases, and the glass is degraded in climate resistance. The content of $Li_2O$ is therefore limited to the range of 2 to 20%. It is preferably in the range of 5 to 18%.

CaO serves to maintain the low-temperature softening property and the intended optical constants of the glass when it is co-present with $B_2O_3$ and $SiO_2$ in specific content ranges. When the content thereof is less than 5%, the glass transition temperature increases, and the optical constants of the glass are outside the intended ranges. When it exceeds 15%, the glass may be degraded in durability and climate resistance. The content of CaO is therefore limited to the range of 5 to 15%. It is preferably in the range of 6 to 12%.

ZnO is a very important component for maintaining the low-temperature softening property and high climate resistance of the glass. Particularly, when much ZnO is incorporated in place of BaO, the glass is remarkably improved in climate resistance. In conventional glasses having the same optical constants as those in the present invention, ZnO is used for adjusting the optical constants like BaO and CaO. In the glass composition of the present invention, ZnO improves the glass in climate resistance to a great extent as compared with the other two divalent components, and it is also a component that is the most excellent in improvement of the low-temperature softening property and adjustment of the optical constants. When the content of ZnO is less than 2%, it is no longer possible to maintain the intended climate resistance and low-temperature softening property. When the content thereof is greater than 14%, the glass is degraded in stability, and the liquidus temperature of the glass increases, so that the hot-forming of a preform may be impaired. The content of ZnO is therefore limited to the range of 2 to 14%. It is preferably in the range of 3 to 12%.

$La_2O_3$ is a component essential not only for improving the glass in durability and climate resistance but also for adjusting the optical constants of the glass. When the content thereof exceeds 4%, the refractive index of the glass may be higher than the desired range, and the Abbe's number (vd) may decrease, so that the content thereof is limited to 4% or less. Further, when the content thereof is less than 0.5%, $La_2O_3$ has little effect on improving the climate resistance, so that the content thereof is limited to the range of 0.5 to 4%. It is preferably in the range of 1 to 3%.

The above-described components are essential for the optical glass IV.

Both $Gd_2O_3$ and $Y_2O_3$ are components that are used for improving the glass in climate resistance and adjusting the optical constants of the glass. When the content of any one of these exceeds 3%, the optical constants are liable to be outside the desired range, and the glass is degraded in low-temperature softening property. The content of each of these components is therefore limited to the range of 0 to 3%. For maintaining the climate resistance of the glass, however, the total content of $La_2O_3$, $Gd_2O_3$ and $Y_2O_3$ is limited to 1% or more.

$Al_2O_3$ is a component that is incorporated for improving the glass in durability and climate resistance. When the content thereof exceeds 5%, the glass transition temperature (Tg) sharply increases, and the optical constants may be outside the desired ranges, so the content of $Al_2O_3$ is limited to 0 to 5%. It is preferably 0 to 4%.

$ZrO_2$ is a component that is used for improving the glass in climate resistance and adjusting the optical constants of the glass. When the content thereof is over 3%, the optical constants are liable to be outside the desired ranges, and the glass is degraded in low-temperature softening property. The content of $ZrO_2$ is therefore limited to 0 to 3%.

BaO is a component that is incorporated for adjusting the optical constants of the glass. Since, however, BaO degrades the glass in climate resistance, it is preferred to decrease the content thereof to make it as small as possible. Particularly, when BaO is incorporated in an amount of over 5%, the glass is degraded in climate resistance to a considerable degree, so that the content of BaO is limited to 0 to 5%. It is preferably 0 to 4%.

The optical glass IV preferably has a glass composition comprising 24 to 38% of $B_2O_3$, 15 to 35% of $SiO_2$, 5 to 18% of $Li_2O$, 6 to 12% of CaO, 3 to 12% of ZnO, 1 to 3% of $La_2O_3$, 0 to 3% of $Gd_2O_3$, 0 to 3% of $Y_2O_3$, 0 to 4% of $Al_2O_3$, 0 to 3% of $ZrO_2$ and 0 to 4% of BaO.

In addition to the above components, the optical glass IV of the present invention may comprise a general refining agent such as $Sb_2O_3$ and components such as F, $P_2O_5$, $Na_2O$, $K_2O$, SrO, etc., in such small amounts that they do not impair properties of the glass. For imparting the glass with the desired optical constants, low-temperature softening property and climate resistance, the total content of $B_2O_3$, $SiO_2$, $Li_2O$, CaO, ZnO, $La_2O_3$, $Gd_2O_3$, $Y_2O_3$, $Al_2O_3$, $ZrO_2$ and BaO is adjusted to more than 96%. The above total content is preferably 98% or more, more preferably 99% or more. The above total content is still more preferably 100% except for the refining agent. Above all, The optical glass IV preferably includes a glass comprising $B_2O_3$, $SiO_2$, $Li_2O$, CaO, ZnO, $La_2O_3$, $Gd_2O_3$, $Y_2O_3$, $Al_2O_3$ and $ZrO_2$, a glass comprising $B_2O_3$, $SiO_2$, $Li_2O$, CaO, ZnO, $La_2O_3$, $Gd_2O_3$, $Y_2O_3$, $Al_2O_3$, $ZrO_2$ and BaO, and glasses obtained by adding a refining agent to each of the above two glasses.

In the optical glass IV, the glass transition temperature (Tg) can be also used as an index for the low-temperature softening property. The glass transition temperature is preferably 560° C. or lower, more preferably 550° C. or lower, still more preferably 540° C. or lower.

Further, the haze value of the optical glass IV is preferably 3% or less, more preferably 2% or less, still more preferably 1% or less.

In any one of the optical glasses I to IV, it is preferred to remove harmful substances such as lead, thorium, cadmium, tellurium, etc., from glass raw materials. It is also preferred not to use any arsenic compound in view of environmental influences.

<Press-molding Preform and Process for the Production thereof>

A press-molding preform (to be referred to as "preform" hereinafter) refers to a glass material that is to be press-molded into a product by heating and softening it, and it is a preparatory glass product that is prepared in advance so as to have a form suitable for press-molding. Generally, the volume which a glass has before press-molding remains unchanged after the glass is press-molded. For producing a press-molded product having a predetermined volume, therefore, it is arranged that the preform should also have the predetermined volume. Generally, the volume of a glass is controlled on the basis of its weight.

For press-molding a preform into an optical element having the property of rotation symmetry such as a lens, desirably, the preform also has a rotation-symmetrical form. For example, it has the form of a sphere or a marble.

Particularly, it is required to control the weight of a precision press-molding preform accurately and severely, since a press-molding process alone is employed to form an optical-function surface or attain remarkably high form accuracy. Further, for avoiding the trapping of gas between a preform and the molding surface of a mold, it is desirable to take account of the curvature of the molding surface and dimensions of a product to be produced by press-molding when the form of the preform is determined.

The preform of the present invention is made of any one of the above optical glasses I to IV. In one case, preforms are used for press-molding immediately after produced, and in another case, preforms are stored as stocks and used for press-molding as required. The preform of the present invention is free from surface deterioration and fogging when stored for a long period of time or stored under usual weather conditions owing to the excellent climate resistance that the optical glasses of I to IV have.

When the above preform of the present invention is used, therefore, there can be produced an optical element having an excellent surface by press-molding. When an optical element is produced by precision press-molding, the surface of a preform remains as a surface of the optical element, and the surface is not removed by machining such as grinding or polishing. Fogging of the preform surface causes a defect on the surface of an optical element, particularly, a cloudy optical-function surface. The preform of the present invention is made of a glass material having excellent climate resistance, so that it can give a press-molded product having an excellent surface.

The method of producing the preform of the present invention will be explained below. First, a molten glass that can give one of the optical glasses I to IV is prepared by melting, refining and stirring glass raw materials such as generally used oxides, carbonates, sulfates, nitrates, fluorides, hydroxides, and the like. The above molten glass is allowed to flow downward from a temperature-controlled nozzle made of platinum or the like at a constant flow rate, and a flowing part of the glass is received on a mold member to form a preform. The method of separating a molten glass gob having a constant weight from the flow of the above molten glass includes a method in which the glass is dropped in the form of a molten glass drop, and a method in which the leading end portion of the flow of the molten glass flowing downward from the nozzle is received on a support member, a narrow portion is formed in the flow, and the above support member is rapidly moved downward (at a velocity greater than the velocity of the flow of the molten glass) at a time when a molten glass gob having a desired weight can be separated, to separate the support-removed leading end portion of the molten glass from the above narrow portion.

The molten glass gob received on the mold member can be formed into a preform by floating and rotating the gob with the pressure of a gas blown to the gob. After the temperature of the glass decreases to a temperature around its glass transition temperature, the preform is taken out of the mold. The preform that is taken out may be annealed so that it does not break under a sharp temperature change.

In the above method, the optical glasses I to IV having excellent climate resistance are used, so that preforms having excellent surfaces can be obtained. The above method is suitable for producing a precision press-molding preform.

The preform of the present invention is made of a glass having excellent climate resistance, so that the surface fogging caused by washing, etc., can be effectively prevented. A thin film may be formed on the preform surface as required by a known method.

<Optical Element and Process for the Production thereof>

The optical element of the present invention is made of any one of the above optical glasses I to IV. Therefore, there can be provided an optical element having excellent climate resistance. The optical element includes an optical element obtained by press-molding, an optical element obtained by further grinding and polishing a press-molded product, an optical element obtained by precision press-molding, and an optical element obtained by casting a molten glass to form a formed glass product, annealing the formed glass product to remove a distortion and subjecting it to machining processes such as cut-off, cutting, grinding and polishing. The optical element includes, for example, various optical lenses such as a spherical lens, an aspherical lens, a micro-lens, a micro-lens array, a pick-up lens and a cylindrical lens, a diffraction grating, and prism. The optical element may be provided with an optical multi-layered coat such as an anti-reflection coat, a partial reflection coat, a high reflection coat, or the like. Since the glass constituting the optical element has excellent climate resistance, the surface of the optical element can be kept clean and an excellent coat can be formed when the above multi-layered coat is formed. Further, when the optical element is used for a long period of time, there is not caused any failure such as peeling of the coat.

The process for producing an optical element will be explained below. First, the above preform is heated in a non-oxidizing atmosphere, for example, in a nitrogen atmosphere or a nitrogen/hydrogen mixed atmosphere to soften it, and precision press-molded into a formed product with a mold having a precision-machined molding surface, and the formed product is annealed to obtain an optical element. Further, the press-molded glass product may be grinded and polished to obtain an optical element such as a lens.

EXAMPLES

The present invention will be explained in detail with reference to Examples hereinafter, while the present invention shall not be limited by Examples.

Examples 1–28

Oxides, carbonates, sulfates, nitrates, fluorides, hydroxides, and the like such as $SiO_2$, $Al_2O_3$, $Al(OH)_3$, $CaCO_3$, $ZnO$, $La_2O_3$, $Gd_2O_3$, $Y_2O_3$, $ZrO_2$, $Li_2CO_3$, etc., corresponding to glass components were provided as required, 250 to 300 g of these materials were weighed so as to obtain a glass composition shown in Tables 1 and 2, and the weighed materials were fully mixed to obtain a formulated batch. The formulated batch was placed in a platinum crucible and melted in air at 1,200 to 1,250° C. with stirring for 2 to 4 hours to form a glass. Then, a molten glass was cast into a 40×70×15 mm carbon mold, allowed to cool to a glass transition temperature (Tg) and immediately placed in an annealing furnace, and the glass was annealed around the glass transition temperature for approximately 1 hour and then allowed to cool to room temperature in the annealing furnace. In the thus-obtained glasses in Examples 1 to 28, there was precipitated no crystal observable through a microscope. In each Example, there may be added $Sb_2O_3$ in such an amount that $Sb_2O_3$ is generally added as a refining agent.

Each of the optical glasses in Examples 1 to 28 was measured for a refractive index (nd), an Abbe's number (vd) and a glass transition temperature (Tg), evaluated for glass climate resistance, by the following methods, and each glass was also measured for a density. Table 3 shows the results.

(1) Refractive Index (nd) and Abbe's Number (vd)

An optical glass sample was measured at a gradual temperature decrease ratio of −30° C./hour.

(2) Glass Transition Temperature (Tg)

An optical glass sample was measured at a temperature elevation rate of 4° C./minute with a thermo-mechanical analyzer supplied by Rigaku Denki K.K.

(3) Evaluation of Climate Resistance

A sample (20×20×2 mm) was optically polished until no scratching came to be found. The sample was washed and then held in an environmental tester (Clean constant-temperature constant-humidity tester "PCR-3SP" supplied by ESPEC Corp.) set at a temperature of 65° C. and at a relative humidity of 0% in a clean booth (class 1000) for 1 hour, and then the sample was held therein at 65° C. at a relative humidity 95% (using ultrapure water) for 2 weeks. The thus-prepared glass sample was measured for haze values with a haze meter ("AUTOMATIC HAZE METER MODEL TC-H III DPK" supplied by Tokyo Denshoku K.K.).

The optical glasses had a refractive index (nd) between 1.57 to 1.67, an Abbe's number (vd) between 55 to 65 and a glass transition temperature (Tg) of 560° C. or lower, and as to climate resistance, they had a haze value of 3% or smaller. They had a density in the range of 2.9 to 3.4.

TABLE 1

| Example | Glass composition (mol %) | | | | | | |
|---|---|---|---|---|---|---|---|
| | $B_2O_3$ | $SiO_2$ | $Li_2O$ | CaO | ZnO | $La_2O_3$ | $Gd_2O_3$ |
| 1 | 28.77 | 30.36 | 15.27 | 10.84 | 4.17 | 2.46 | 0.15 |
| 2 | 31.25 | 26.15 | 14.38 | 11.70 | 5.76 | 3.08 | 0.21 |
| 3 | 33.90 | 21.64 | 13.43 | 12.64 | 7.47 | 3.75 | 0.28 |
| 4 | 36.76 | 16.77 | 12.40 | 13.65 | 9.30 | 4.47 | 0.34 |
| 5 | 27.62 | 32.32 | 15.69 | 10.43 | 3.43 | 2.17 | 0.12 |
| 6 | 27.60 | 32.35 | 16.70 | 9.40 | 3.50 | 2.20 | 0.00 |
| 7 | 31.60 | 28.35 | 15.70 | 10.40 | 3.50 | 2.20 | 0.00 |
| 8 | 27.60 | 32.35 | 16.70 | 10.40 | 3.50 | 2.20 | 0.00 |
| 9 | 27.60 | 32.35 | 17.70 | 10.40 | 3.50 | 2.20 | 0.00 |
| 10 | 27.60 | 32.35 | 15.70 | 10.40 | 4.50 | 2.20 | 0.00 |
| 11 | 29.60 | 30.35 | 14.50 | 10.40 | 7.50 | 2.20 | 1.20 |
| 12 | 29.60 | 30.35 | 12.00 | 10.40 | 10.00 | 2.20 | 1.20 |
| 13 | 29.60 | 30.35 | 15.50 | 9.40 | 7.50 | 2.20 | 1.20 |
| 14 | 31.60 | 30.35 | 15.50 | 7.40 | 7.50 | 2.20 | 1.20 |
| 15 | 31.60 | 30.35 | 15.50 | 9.40 | 7.50 | 2.20 | 1.20 |
| 16 | 32.60 | 27.35 | 15.50 | 9.40 | 7.50 | 2.20 | 1.20 |
| 17 | 29.60 | 30.35 | 18.00 | 9.40 | 5.00 | 2.20 | 1.20 |
| 18 | 29.60 | 30.35 | 15.85 | 9.40 | 7.50 | 2.20 | 0.85 |
| 19 | 29.60 | 30.35 | 15.85 | 9.40 | 7.50 | 2.20 | 1.65 |
| 20 | 29.60 | 30.35 | 15.85 | 9.40 | 7.50 | 3.00 | 0.85 |
| 21 | 30.10 | 30.35 | 15.50 | 9.40 | 7.50 | 2.20 | 0.70 |
| 22 | 30.10 | 30.35 | 15.50 | 9.40 | 7.50 | 2.20 | 1.20 |
| 23 | 30.10 | 30.35 | 15.50 | 9.40 | 7.50 | 1.70 | 1.20 |
| 24 | 31.60 | 30.35 | 15.50 | 9.85 | 5.50 | 2.20 | 1.20 |
| 25 | 31.60 | 30.35 | 15.50 | 9.40 | 4.30 | 2.20 | 1.20 |
| 26 | 31.60 | 30.35 | 15.50 | 7.40 | 6.00 | 2.20 | 1.20 |
| 27 | 31.00 | 30.35 | 15.85 | 8.00 | 7.50 | 3.00 | 0.85 |
| 28 | 31.00 | 30.35 | 15.35 | 8.00 | 8.00 | 3.00 | 0.85 |

TABLE 2

| Example | Glass composition (mol %) | | | | | $La_2O_3$ + $Gd_2O_3$ + $Y_2O_3$ |
|---|---|---|---|---|---|---|
| | $Y_2O_3$ | $Al_2O_3$ | $ZrO_2$ | BaO | Total | |
| 1 | 1.10 | 2.22 | 0.98 | 3.68 | 100.00 | 3.71 |
| 2 | 1.52 | 1.73 | 1.36 | 2.86 | 100.00 | 4.81 |
| 3 | 1.97 | 1.17 | 1.77 | 1.98 | 100.00 | 6.00 |
| 4 | 2.46 | 0.62 | 2.20 | 1.03 | 100.00 | 7.27 |
| 5 | 0.91 | 2.45 | 0.80 | 4.06 | 100.00 | 3.20 |
| 6 | 1.00 | 2.45 | 0.80 | 4.00 | 100.00 | 3.20 |
| 7 | 1.00 | 2.45 | 0.80 | 4.00 | 100.00 | 3.20 |
| 8 | 1.00 | 2.45 | 0.80 | 3.00 | 100.00 | 3.20 |
| 9 | 1.00 | 2.45 | 0.80 | 2.00 | 100.00 | 3.20 |
| 10 | 1.00 | 2.45 | 0.80 | 3.00 | 100.00 | 3.20 |
| 11 | 1.00 | 2.45 | 0.80 | 0.00 | 100.00 | 4.40 |
| 12 | 1.00 | 2.45 | 0.80 | 0.00 | 100.00 | 4.40 |
| 13 | 1.00 | 2.45 | 0.80 | 0.00 | 100.00 | 4.40 |
| 14 | 1.00 | 2.45 | 0.80 | 0.00 | 100.00 | 4.40 |
| 15 | 1.00 | 0.45 | 0.80 | 0.00 | 100.00 | 4.40 |
| 16 | 1.00 | 2.45 | 0.80 | 0.00 | 100.00 | 4.40 |
| 17 | 1.00 | 2.45 | 0.80 | 0.00 | 100.00 | 4.40 |
| 18 | 1.80 | 2.45 | 0.00 | 0.00 | 100.00 | 4.85 |
| 19 | 1.00 | 2.45 | 0.00 | 0.00 | 100.00 | 4.85 |
| 20 | 1.00 | 2.45 | 0.00 | 0.00 | 100.00 | 4.85 |
| 21 | 1.00 | 2.45 | 0.80 | 0.00 | 100.00 | 3.90 |
| 22 | 0.50 | 2.45 | 0.80 | 0.00 | 100.00 | 3.90 |
| 23 | 1.00 | 2.45 | 0.80 | 0.00 | 100.00 | 3.90 |
| 24 | 1.00 | 2.00 | 0.80 | 0.00 | 100.00 | 4.40 |
| 25 | 1.00 | 2.45 | 0.80 | 1.20 | 100.00 | 4.40 |
| 26 | 1.00 | 2.45 | 0.80 | 1.50 | 100.00 | 4.40 |
| 27 | 1.00 | 2.45 | 0.00 | 0.00 | 100.00 | 4.85 |
| 28 | 1.00 | 2.45 | 0.00 | 0.00 | 100.00 | 4.85 |

TABLE 3

| Example | Properties of optical glass | | | | |
|---|---|---|---|---|---|
| | nd | vd | Tg (° C.) | Haze value (%) | Density (g/cm³) |
| 1 | 1.63034 | 57.72 | 530 | 2.50 | 3.1 |
| 2 | 1.64485 | 56.72 | 535 | 2.10 | 3.2 |
| 3 | 1.66008 | 55.61 | 542 | 2.50 | 3.3 |
| 4 | 1.67581 | 54.5 | 550 | 2.00 | 3.4 |
| 5 | 1.62206 | 58.08 | 531 | 0.70 | 3.035 |
| 6 | 1.62171 | 58.16 | 521 | 0.80 | 3.026 |
| 7 | 1.62352 | 58.44 | 525 | 0.85 | 3.027 |
| 8 | 1.62092 | 58.3 | 522 | 0.75 | 2.995 |
| 9 | 1.6189 | 58.28 | 519 | 0.65 | 2.954 |
| 10 | 1.62145 | 58.24 | 523 | 0.55 | 3.009 |
| 11 | 1.62809 | 57.26 | 531 | 0.4 | 3.072 |
| 12 | 1.63031 | 57.04 | 540 | 0.4 | 3.125 |
| 13 | 1.62685 | 57.51 | 525 | 0.5 | 3.065 |
| 14 | 1.6209 | 58.14 | 526 | 0.5 | 3.025 |
| 15 | 1.62881 | 58.01 | 531 | 0.4 | 3.069 |

TABLE 3-continued

| | Properties of optical glass | | | | |
|---|---|---|---|---|---|
| Example | nd | vd | Tg (° C.) | Haze value (%) | Density (g/cm$^3$) |
| 16 | 1.62867 | 57.87 | 522 | 0.3 | 3.066 |
| 17 | 1.62427 | 57.91 | 520 | 0.5 | 3.004 |
| 18 | 1.62575 | 57.83 | 525 | 0.7 | 3.048 |
| 19 | 1.62724 | 57.76 | 523 | 0.5 | 3.094 |
| 20 | 1.62815 | 57.95 | 521 | 0.3 | 3.076 |
| 21 | 1.62218 | 57.88 | 525 | 0.5 | 3.005 |
| 22 | 1.62322 | 57.76 | 523 | 0.5 | 3.035 |
| 23 | 1.62152 | 57.92 | 525 | 0.4 | 3.016 |
| 24 | 1.62371 | 58.13 | 535 | 0.5 | 3.026 |
| 25 | 1.62311 | 58.29 | 528 | 0.3 | 3.035 |
| 26 | 1.62315 | 57.91 | 528 | 0.45 | 3.064 |
| 27 | 1.62466 | 57.95 | 524 | 0.35 | 3.053 |
| 28 | 1.62736 | 57.56 | 523 | 0.6 | 3.065 |

Example 29

A large amount of a glass that was to give the glass in one of Examples 1 to 28 was melted, refined and stirred, and then the molten glass was allowed to flow at a constant rate from a temperature-controlled nozzle made of platinum, to constantly drop molten glass drops having a constant weight. Each molten glass drop was floated and rotated to form preforms having the above weight.

Further, a leading end portion of the flow of the molten glass flowing downward from the nozzle was received on a support member, the support member was rapidly moved downward at a time when a molten glass gob having a predetermined weight was obtained, to receive the molten glass gob on the support member, and the glass gob was floated and rotated by blowing a gas, to form a preform.

In the above manner, preforms having a controlled weight and having a diameter of 2–30 mm were produced from the glasses in Examples 1 to 28.

Example 30

The preforms obtained in Example 29 were precision-press-molded with a press machine shown in FIG. 1, to give aspherical lenses.

In FIG. 1, one of the various preforms 4 obtained in different manners in Example 29 was placed between a lower mold member 2 and an upper mold member 1 having aspherical molding surfaces, then, atmosphere inside a quartz tube 11 was replaced with a nitrogen atmosphere, and a heater 12 was electrically powered to heat an inside of the quartz tube 11. The temperature inside a mold was set at a temperature higher than a glass transition temperature by 20 to 60° C., and while the set temperature was maintained, a pressing rod 13 was moved downward to press the upper mold member 1, to press-mold the preform 4 inside the mold. The press-molding was carried out at a press-molding pressure of 8 MPa for a forming time period of 30 seconds, and then, the press-molding pressure was decreased. A precision press-molded aspherical lens was gradually cooled to a temperature that was lower than the glass transition temperature by −30° C. in a state where the aspherical lens was in contact with the upper mold member 1 and the lower mold member 2, and the aspherical lens was rapidly cooled to room temperature and then taken out of the mold. In FIG. 1, reference numeral 3 indicates a guide mold member, numeral 9 indicates a support rod, numeral 10 indicates a support bed, and numeral 14 indicates a thermocouple.

The thus-obtained various aspherical lenses were highly accurate lenses.

This Example explains aspherical lenses as an example, while other optical elements can be produced in the same manner as above.

Effect of the Invention

According to the present invention, there can be provided an optical glass having a refractive index (nd) of 1.57 to 1.67 and an Abbe's number (vd) of 55 to 65 and having a low-temperature softening property and excellent climate resistance.

According to the present invention, further, there can be provided a press-molding preform having desired optical constants and excellent climate resistance, which gives an optical element by press-molding, and a process for producing the preform.

Further, according to the present invention, there can be provided an optical element having desired optical constants and excellent climate resistance and a process for producing the optical element.

What is claimed is:

1. An optical glass which comprises, by mol %, 22 to 40% of $B_2O_3$, 12 to 40% of $SiO_2$, 2 to 20% of $Li_2O$, 5 to 15% of CaO, 2 to 14% of ZnO, 0.5 to 4% of $La_2O_3$, 0 to 3% of $Gd_2O_3$, 0 to 3% of $Y_2O_3$, the total content of $La_2O_3$, $Gd_2O_3$ and $Y_2O_3$ being at least 1%, 0 to 5% of $Al_2O_3$, 0 to 3% of $ZrO_2$ and 0 to 5% of BaO, the total content of the above components being more than 96%, said optical glass having a refractive index (nd) of 1.57 to 1.67, an Abbe's number (vd) of 55 to 65 and a glass transition temperature (Tg) of 550° C. or lower and having a haze value of 3% or less in terms of climate resistance.

2. The optical glass as recited in claim 1, which has a glass transition temperature (Tg) of 540° C. or lower.

3. The optical glass as recited in claim 1, which comprises $B_2O_3$, $SiO_2$, $Li_2O$, CaO, ZnO and $La_2O_3$.

4. An optical glass consisting of, by mol %, 22 to 40% of $B_2O_3$, 12 to 40% of $SiO_2$, 2 to 20% of $Li_2O$, 5 to 15% of CaO, 2 to 14% of ZnO, 0.5 to 4% of $La_2O_3$, 0 to 3% of $Gd_2O_3$, 0 to 3% of $Y_2O_3$, the total content of $La_2O_3$, $Gd_2O_3$ and $Y_2O_3$ being at least 1%, 0 to 5% of $Al_2O_3$, 0 to 3% of $ZrO_2$ and 0% of BaO, the total content of the above components being more than 96%, and having a refractive index (nd) of 1.57 to 1.67 and an Abbe's number (vd) of 55 to 65.

5. The optical glass as recited in claim 4, which comprises a refining agent.

6. The optical glass as recited in claim 4, which has a glass transition temperature (Tg) of 550° C. or lower and has a haze value of 3% or less in terms of climate resistance.

7. The optical glass as recited in claim 4, which has a glass transition temperature (Tg) of 540° C. or lower and has a haze value of 3% or less in terms of climate resistance.

8. A press-molding preform, which is made of the optical glass recited in claim 1 or 4.

9. A process for producing an optical element, which comprises heating, softening and press-molding the preform recited in claim 8.

10. An optical element made of the optical glass recited in claim 1 or 4.

11. A process for producing a preform for press-molding, which comprises separating a predetermined amount of a molten glass gob from a molten glass flow of the optical glass recited in claim 1 or 4, and forming the gob into a glass preform.

12. A process for producing an optical element, which comprises heating, softening and press-molding a preform obtained by the process recited in claim 11.

* * * * *